March 21, 1944.    M. G. CROSBY    2,344,679
BEAM PHASE DETECTOR
Filed April 3, 1941    3 Sheets-Sheet 1
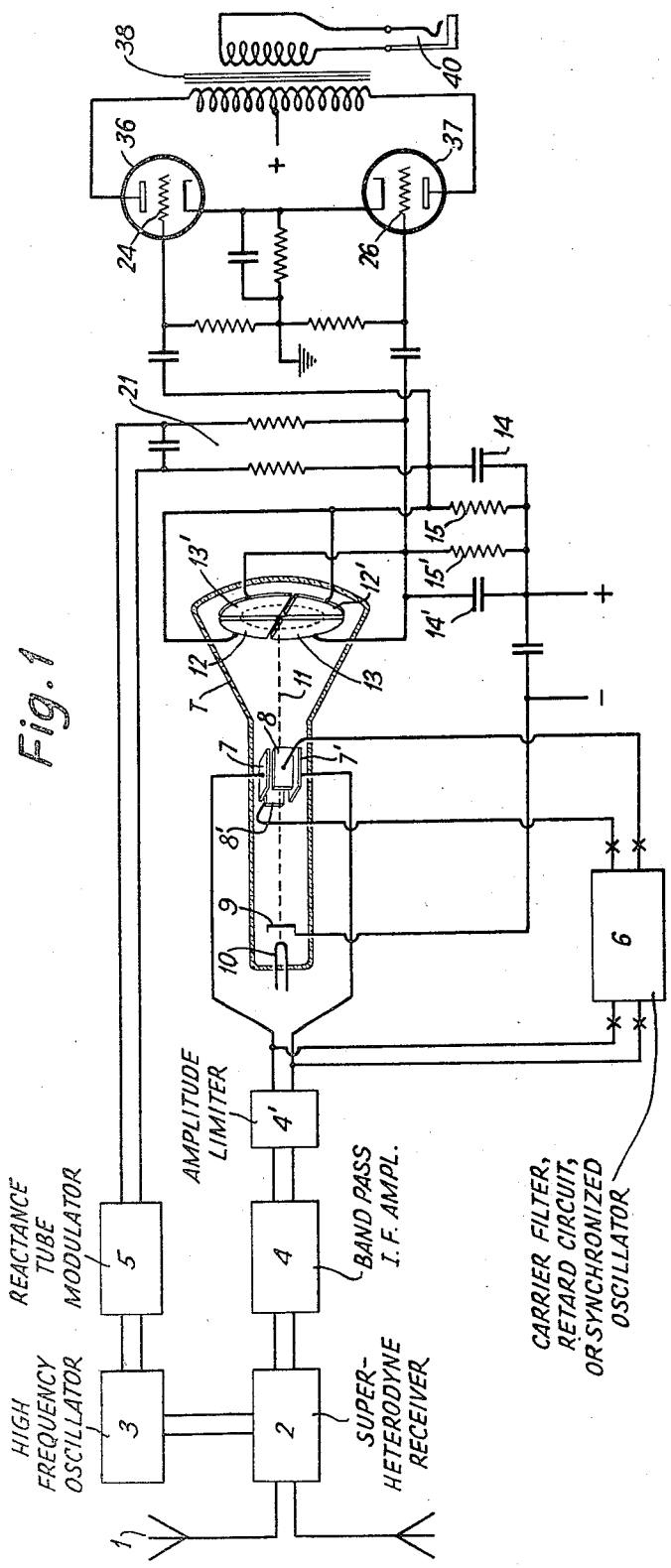
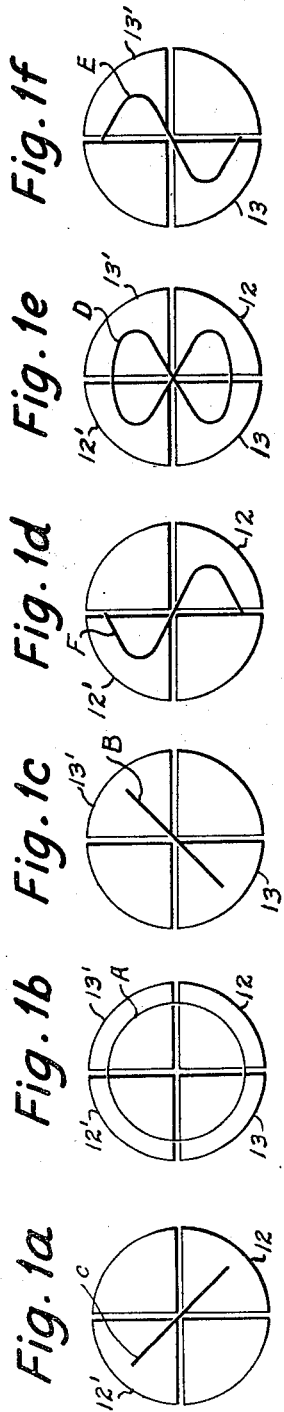
INVENTOR
MURRAY G. CROSBY
BY H. G. Grover
ATTORNEY

INVENTOR
MURRAY G. CROSBY
BY
ATTORNEY

March 21, 1944.　　　M. G. CROSBY　　　2,344,679
BEAM PHASE DETECTOR
Filed April 3, 1941　　　3 Sheets-Sheet 3
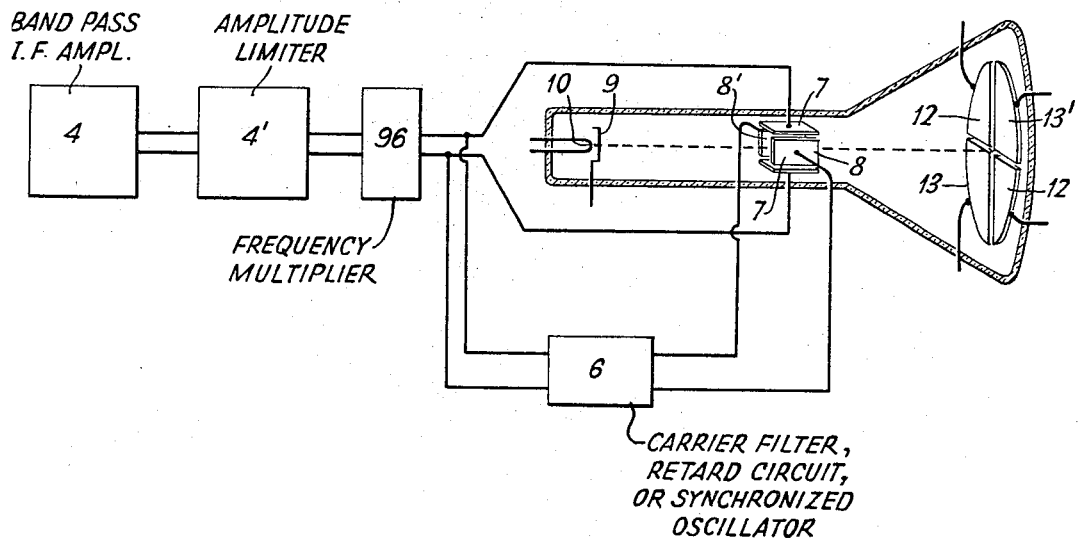
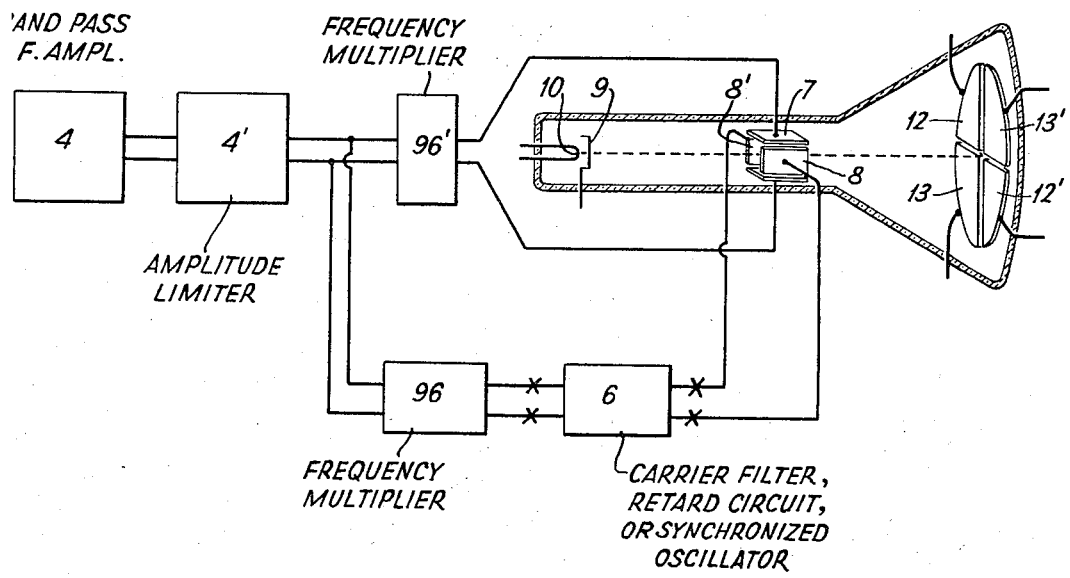
INVENTOR
MURRAY G. CROSBY
BY H. S. Snover
ATTORNEY Patented Mar. 21, 1944

2,344,679

UNITED STATES PATENT OFFICE 2,344,679

BEAM PHASE DETECTOR

Murray G. Crosby, Riverhead, N. Y., assignor to Radio Corporation of America, a corporation of Delaware Application April 3, 1941, Serial No. 386,639

12 Claims. (Cl. 250—27)

This application concerns a phase detector utilizing a cathode ray type of vacuum tube having a beam which is deflected by the two voltages whose phase difference is to be detected. One of the deflecting voltages may vary in phase at signal frequency and may be representative of a phase or frequency modulated wave. The beam forms Lissajous figures on anode segments which are so arranged as to draw their beam current according to the shape of the Lissajous figure. The shape of the Lissajous figure is controlled by the relative phases of the deflecting voltages. In this way the detector is made sensitive to phase changes, but insensitive to amplitude changes.

In the prior art of phase detectors, the conventional type of vacuum tubes have been used connected in circuits which depended for their operation upon the fact that the phase variation between the two voltages caused an amplitude variation. In the phase detector of the present invention, the principle of beam deflection is utilized. This result in a more complete elimination of undesired amplitude modulation and permits various flexibilities of design which will be disclosed hereinafter.

In describing my invention, reference will be made to the attached figures wherein:

Figure 1 illustrates a system for receiving phase or frequency modulated waves including a tube of the beam type having a novel electron collecting electrode with the tube electrodes connected in a new phase detecting circuit.

In Figures 1a to 1f, Lassajous curves are shown superposed over the anode or collecting electrode of the tube of Figure 1, the several curves showing different paths followed by the beam on the target or electron collecting electrode under the control of the deflecting voltages.

Figures 5 and 6 are modifications of the arrangement of Figure 1.

Figure 2:
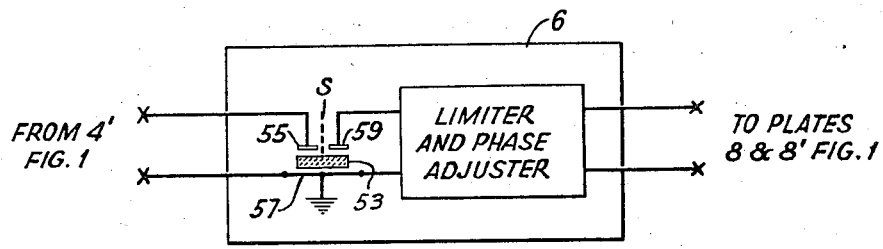
Figures 2, 3 and 4 illustrate details of a portion of the circuit of Figure 1.

The circuit of Figure 1 shows the phase detecting tube T connected in a circuit which may be adapted for phase or frequency modulation reception. For the sake of simplicity only those elements of the tube used in the present circuits are shown, it being understood that additional elements, such as focusing electrodes, grids, and collecting electrodes, the use of which are well known in the art, may be added.

The tube T, which may be in an evacuated glass or metal envelope, includes elements 7 to 13', inclusive. Element 10 is the heater for cathode 9 which emits a beam of electrons, 11, between deflecting plates 7, 7' and 8, 8' to anodes 12, 12' and 13, 13' of the electron collecting or target electrode. The operation of the tube is in many respects like that of an ordinary cathode-ray oscilloscope tube except that the viewing screen is replaced by the segmented anode as shown. The two voltages having the phase difference are connected to opposite deflection plates one across plates 7 and 7', the other across plates 8 and 8', so that when the phase difference is 90 degrees the beam 11 will traverse the well-known circular pattern A as shown in Figure 1b. With this phase relation it can be seen that all four anode segments 12, 13, 12' and 13' will receive equal current. When the phase relation is zero degrees, the Lissajous figure becomes a straight line B in the first and third quadrants, electrodes 13' and 13 of the target or anode (counting the first quadrant as 13', the second as 12, and so on), as shown in Figure 1c. When the phase difference is 180 degrees, the figure C impinges only the second and fourth quadrants, i. e., electrodes 12 and 12', as shown in Figure 1a. For phase differences changing from 90 degrees to 0 degrees the beam will follow a path that changes from a circle A (Figure 1b) to an ellipse and then to a straight line C (Figure 1a) as an in-phase relation is reached. For phase differences changing from 90 degrees to 180 degrees the said deformation of the circle A (Figure 1b) will be the same but in a sense to reach a straight line B in quadrants 13 and 13' as shown in Figure 1c.

Thus, it can be seen that as the phase shifts from 90 degrees, the current to the anode segments will shift from balance to a concentration on one pair of segments. By connecting segments 13 and 13' together, as well as 12 and 12', a current is obtained in resistors 15 and 15', connected to electrodes 12 and 12' and 13 and 13', respectively, which is proportional to the phase difference between the voltages applied to the deflecting plates 7, 7', 8 and 8'. These currents will be modulated by the carrier frequency applied to the deflection plates and to prevent the appearance of voltages of carrier frequency in the resistances 15 and 15', the latter are shunted by smoothing condensers 14 and 14'.

It will be apparent that, as long as the amplitude of deflection is sufficient to be fairly large compared to the dimensions of the spaces between the segments, the amplitude of the collected current will be constant regardless of the amount of deflection. This constancy of collected current is the result of two compensating effects which control the magnitude of the current. It can be seen that the amount of current collected will depend upon the velocity of sweep of the beam and upon the length of path traversed by the beam. As the amplitude of the voltage fed to the deflector plates is increased, the velocity of sweep will increase. For a constant path length the amount of current would be inversely proportional to the velocity of sweep so that increased amplitude would cause less current to be collected. However, when the collector plates are sector-shaped as shown, the length of path increases as the amplitude increases. This causes an increase of the collected current when the amplitude is increased. Hence the peripheral velocity and the path to be swept by the beam have a compensating effect which holds the current constant regardless of amplitude modulation. Consequently, this detecting system is insensitive to amplitude modulation, and unlike the balance against amplitude modulation effected by prior balanced detectors, the undesired amplitude modulation is rejected in the presence of the desired modulation as well as in its absence.

The Lissajous figures C, A and B of Figures 1a, 1b, and 1c are formed when the two voltages, supplied to deflecting electrodes 7, 7' and 8, 8', to be phase detected are in a one-to-one frequency ratio. Figures 1d, 1e, and 1f show the figures when the frequency ratio of the voltages supplied to the deflecting electrodes is two-to-one. The figure D of Figure 1e corresponds to a 90 degree relation between the higher of the two frequencies and the second harmonic of the lower one. The figure D appears on all four anode segments. The figures E and F of Figs. 1f and 1d correspond to the zero and 180 degree positions, respectively. The figure E is formed on segments 13 and 13', while figure F is formed on segments 12 and 12'. It can be seen that this difference in frequency ratio will not effect the proportionality of the currents resulting from the phase differences. This feature has the advantage that one of the voltages supplied to the deflecting electrodes may be frequency multiplied to multiply the effect of the phase shift. Multiplying the frequency of one of the voltages in this way multiplies the phase difference which existed between the two waves before multiplication. The manner in which the relative phase displacement of two voltages of like phase and frequency is enhanced by multiplying the frequency of one of the voltages has been described in my United States Patent No. 2,112,881, dated April 5, 1938. Hence, by multiplying or dividing the frequency of one of the deflecting voltages a more sensitive phase detection results.

It will be apparent that the use of four segments is not a necessity since two segments will function with somewhat decreased efficiency. With only two segments one of the amplifiers 24 or 26 may be dispensed with and the output of only one of the resistors 14 or 14' amplified for utilization.

The rest of the elements of the circuit of Figure 1 consists of the necessary circuits to form either a frequency modulation receiver like that of my United States application Serial No. 618,154, filed June 20, 1932, or a phase modulation receiver like that of my United States Patent No. 2,065,565, dated December 29, 1936. A receiver satisfactory for supplying the voltages to the deflecting plates 7, 7' and 8 and 8' comprises wave intercepting means 1, wave amplifying means 2 which with oscillator 3 and band-pass filter 4 may comprise a heterodyne receiver. The oscillator 3 may be controlled as to frequency, i. e., tuned by reactance tube modulator 5 in turn controlled by direct current potentials supplied through time constant circuit 21 from the ends of resistances 15 and 15' connected to the electrodes of the anode of tube T.

The intermediate frequency amplifier 4 may be of the band-pass type and may include amplitude limiting means, or amplitude limiting means may be included as a separate means 4'. Such limiting means may be employed for automatic gain control, or may further reduce the undesired amplitude modulation in conjunction with the reduction effected by the detecting system. Voltages of intermediate frequency from the output of amplitude limiter 4' are supplied directly to one pair of deflecting plates, say plates 7 and 7'. Voltages of intermediate frequency are also supplied to unit 6 and from the apparatus in unit 6 to the other pair of deflecting plates, say 8 and 8'. The received wave may be phase modulated, or modulated in frequency.

The apparatus in unit 6 determines whether the receiver is a frequency or phase modulation receiver. If the receiver is a phase modulation receiver of the filtered carrier type, unit 6 comprises the apparatus shown in Figure 2. The shielded crystal comprising crystal 53, input electrodes 55 and 57, shield S and output electrodes 59 and 57 removes the side bands from the intermediate frequency band passed by 4' and leaves substantially only the carrier or mean frequency. The limiter and phase shifter maintain constant amplitude of the stripped carrier and allow adjustment of its phase with respect to the unfiltered carrier fed to the plates 7 and 7' of beam detector. For the condition of no modulation, the phase shifter of 6 is adjusted so that there is a 90 degree phase relation between the filtered energy supplied to plates 7 and 7' and the unfiltered signal supplied to plates 8 and 8'. Then, when the received wave is phase modulated by the phase modulation transmitter, the phase detector detects the phase variations existing between the filtered and unfiltered signal. The detected voltages appearing on resistors 15 and 15' are fed to the grids 24 and 26 of push-pull amplifier tubes 36 and 37 and combined in transformer 38. The detected output is taken from jack 40.

Figure 4:
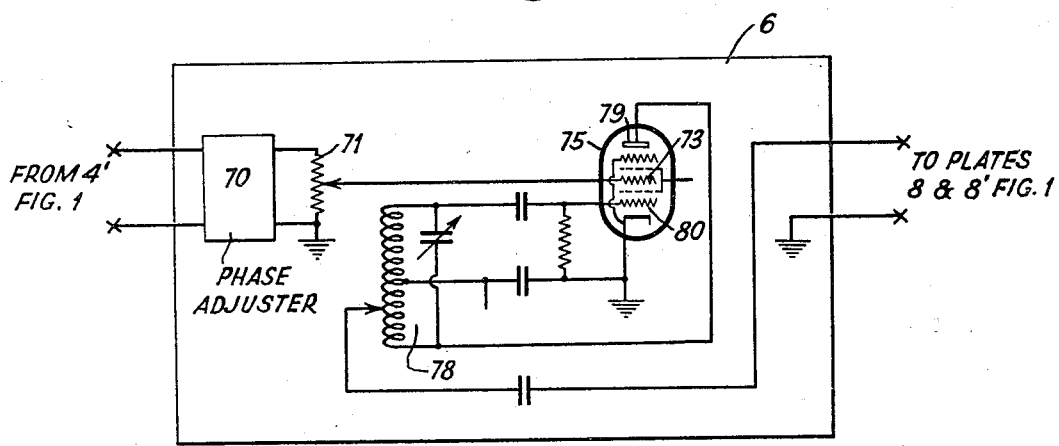

If the receiver is to be used for the synchronized oscillator type of phase modulation receiver, the unit 6 of Figure 4 is used. The wave is first phase and amplitude adjusted by the phase adjuster 70 and potentiometer 71 and then fed to the injector grid 73 of the multi-grid tube 75 acting as the synchronized oscillator having an oscillatory circuit 78 regeneratively connected between its anode 79 and control grid 80. The small amount of signal voltage impressed on the injector grid 73 holds the oscillator barely in step with the signal, but a small enough synchronizing action is employed so that the oscillations generated by the oscillator do not follow the phase or amplitude variations of the injected signal. The audio amplifier tubes 36 and 37 have their anode circuits connected in opposition so that the outputs are combined in push-pull.

Figure 3:
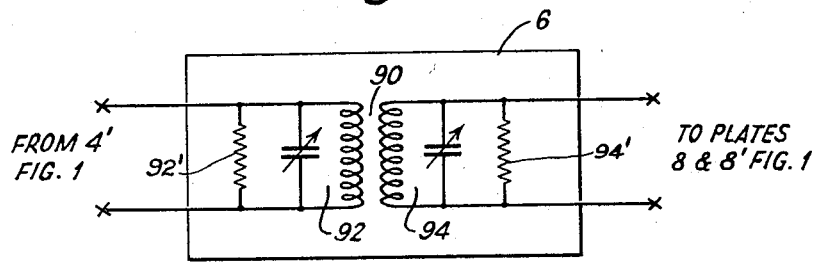

When the receiver is to be used as a frequency modulation receiver, the unit 6 may include the means of Figure 3. In this case, a wave retard circuit consisting of a band-pass tuned transformer 90 is used. This transformer has a primary circuit 92 and a secondary circuit 94 both tuned to the intermediate frequency band. One or both of the circuits 92 and 94 may be damped by a resistance as shown to obtain the desired band-pass characteristic. In Fig. 3 there are specifically shown damping resistances 92' and 94' across the respective tuned circuits 92 and 94. This transformer coupling inherently supplies the required 90 degree phase relationship for the unmodulated condition.

This detector is insensitive to amplitude modulation. The detector rejects amplitude modulation even in the presence of frequency or phase modulation. This gives it a distinct advantage over some detectors in which the amplitude modulation is balanced out in the absence of the desired modulation, but comes through in proportion to the degree of desired modulation present. The present detector does not require the use of a limiter unless it is desired to use the limiter for automatic volume control or to reduce amplitude modulation which might come through the detector due to irregularities in the detector tube and the like. Of course some automatic volume control is necessary in order to keep the deflection fairly large compared with the dimensions of the spaces between collector segments.

In any of these receivers the phase sensitivity of the phase detector may be increased by inserting a frequency multiplier in the circuits feeding the deflection plates. The multiplier or multipliers 96 may be inserted in both deflection plate circuits, as illustrated in Figure 5, or in one or both leads, as illustrated at 96 and 96' in Figure 6.

In the claims the generic terms "timing modulated carrier waves" or "angular velocity-modulated carrier waves" are to be understood as covering frequency or phase modulated carrier waves.

I claim:

1. A carrier wave length modulated wave demodulation system comprising, a cathode ray tube having a plurality of spaced target electrodes connected directly to a modulation signal output circuit, means for deflecting the path of the ray of said tube on said target electrodes in accordance with the wave length modulation on said wave, and the spacing between the target electrodes being sufficiently smaller than the deflection amplitude to maintain the target current in said output circuit constant despite amplitude variations of the carrier wave.

2. In a timing modulated carrier wave demodulation system, an electron discharge tube device having an electron emitting element, a target comprising spaced electrodes mounted symmetrically about the path of emission from said element, deflecting means adjacent said electron emission path, means for applying oscillating voltages, one of which is modulated in accordance with said modulated wave energy, to said deflecting means, a modulation signal output circuit connected directly with said target electrodes to derive a current from the target electrodes, and the spacing of said target electrodes being sufficiently smaller than the electron beam deflection amplitude to maintain said derived current constant.

3. In an angular velocity-modulated carrier wave demodulation system, an electron discharge tube device having an electron emitting element, a target comprising two pairs of spaced electrodes mounted symmetrically about the path of emission from said emission element, two electron stream deflecting means adjacent said electron emission path, means for applying voltages derived from said modulated carrier wave to one of said means, means for applying voltages derived from said modulated wave to the other of said means, at least one of said voltages being modulated, a respective modulation signal output impedance connected with alternate ones of said target electrodes to derive current therefrom, and the relation between the amplitude of electron stream deflection and the target electrode spacing being so chosen that said derived output current is substantially uniform over a range of amplitude variation of said modulated carrier wave.

4. In a timing modulated carrier wave demodulation system, an electron discharge tube device having an electron emitting element, a target comprising pairs of spaced sector-shaped electrodes mounted symmetrically about the path of emission from said electron emitting element, pairs of deflecting plates around said electron emission path, means for applying oscillations, one of which is modulated in accordance with the timing modulated wave energy to said pairs of deflecting plates, phase shifting means in one of said last named means, and a modulation signal output circuit connected directly between pairs of said target electrodes.

5. In a system for demodulating frequency modulated wave energy, an electron discharge device comprising an electron emitting element, a target electrode including a plurality of spaced sector-shaped electron collecting elements located in the path of said emission, pairs of deflecting elements adjacent said path, means for limiting the amplitude of said modulated wave energy and applying it to a pair of said deflecting means, means for producing voltages of a frequency related to the mean frequency of said modulated wave energy, means for applying said produced voltages to another pair of said deflecting means, a frequency multiplier located in the path to at least one pair of said deflecting means, and a modulation signal output circuit connected directly with said electron collecting elements.

6. In a system for demodulating timing modulated carrier wave energy, an electron discharge device comprising an electron emitting element, a target electrode including a plurality of sector-shaped electron collecting elements located in the path of said emission, deflecting elements adjacent said path, means for applying modulated wave energy to at least one of said deflecting elements, means for producing voltages of a frequency related to the mean frequency of said modulated wave energy, phase adjusting means for applying said voltages to another of said deflecting elements, means for frequency multiplying the voltage fed to at least one of the deflecting elements, and a modulation signal output impedance connected directly with all of said target elements to provide a current whose magnitude is uniform over a wide range of variation of the carrier wave amplitude.

7. In a system for demodulating wave length modulated wave energy, an electron discharge tube including an electron emission producing element, a target electrode comprising pairs of sector-shaped elements located symmetrically about the normal path of said emission, pairs of deflecting means spaced about said path, means for amplifying wave length modulated wave energy, means for limiting said amplified wave length modulated wave energy and impressing the same on a pair of said deflecting means, a filter circuit connected between said limiting means and a second pair of said deflecting means, an output impedance, and means for tying pairs of said sector elements together and connecting the same with said output impedance.

8. In a system for demodulating wave length modulated wave energy, an electron discharge tube including an electron emission producing element, a target electrode comprising pairs of sector-shaped elements located symmetrically about the normal path of said emission, pairs of deflecting means spaced about said path, means for amplifying wave length modulated wave energy, means for limiting said amplified wave length modulated wave energy, and impressing the same on a pair of said deflecting means, a band-pass filter circuit connected between said limiting means and a second pair of said deflecting means, an output impedance, and means for tying pairs of said sector elements together and connecting the same with said output impedance.

9. In a system for demodulating wave length modulated wave energy, an electron discharge tube including an electron emission producing element, a target electrode comprising pairs of sector-shaped elements located symmetrically about the normal path of said emission, pairs of deflecting means spaced about said path, means for amplifying wave length modulated wave energy and impressing the same on a pair of said deflecting means, a crystal filter circuit connected between said amplifying means and a second pair of said deflecting means, an output impedance, and means for tying pairs of said sector elements together and connecting the same with said output impedance.

10. In a system for demodulating modulated wave energy, an electron discharge device comprising an electron emitting element, a target electrode including pairs of electron collecting elements located symmetrically about the normal path of said emission, pairs of deflecting elements adjacent said path, means for limiting the amplitude of said wave energy and applying it to a pair of said deflecting means, an entrained oscillator coupled between said limiting means and another pair of said deflecting means, a direct connection between pairs of said electron collecting elements, and output impedances connected between said pairs of electron collecting elements.

11. In a system for detecting the phase variation between two signal-modulated carrier waves, an electron discharge tube device having an electron beam-emitting element, means, energized by said waves and responsive solely to said phase variation, for causing said waves to deflect the beam emitted by said element in the form of a Lissajous figure and without changing the intensity of said beam, and a modulation signal circuit responsive directly to the current of said beam so that said current is dependent upon solely the shape of said Lissajous figure.

12. In a receiver of carrier wave energy modulated in frequency by modulation signals; the method of detection which includes generating a stream of electrons, collecting said electrons, deflecting the stream in one plane without varying its intensity in response to received modulated carrier wave energy, deflecting the stream in another plane without varying its intensity in response to energy of substantially the received carrier frequency, and deriving directly from the collected deflected electrons, and without further demodulation, currents of said modulation signals free of any amplitude variation which may exist in the received modulated carrier energy.

MURRAY G. CROSBY.